United States Patent
Aono (10) Patent No.: US 8,447,825 B2
(45) Date of Patent: May 21, 2013

(54) FILE SHARING SYSTEM AND FILE SHARING METHOD

(75) Inventor: Hiroshi Aono, Tokyo (JP)

(73) Assignee: NEC Corporation, Tokyo (JP)

( * ) Notice: Subject to any disclaimer, the term of this patent is extended or adjusted under 35 U.S.C. 154(b) by 1027 days.

(21) Appl. No.: 12/031,222

(22) Filed: Feb. 14, 2008

(65) Prior Publication Data

US 2008/0201444 A1    Aug. 21, 2008

(30) Foreign Application Priority Data

Feb. 16, 2007    (JP) .................................. 2007-036341

(51) Int. Cl.
    *G06F 15/167*    (2006.01)
(52) U.S. Cl.
    USPC .......................................................... 709/214
(58) Field of Classification Search
    USPC .......................................................... 709/214
    See application file for complete search history.

(56) References Cited

U.S. PATENT DOCUMENTS

| 6,714,952 | B2 * | 3/2004 | Dunham et al. | 707/645 |
| 7,054,927 | B2 * | 5/2006 | Ulrich et al. | 709/223 |
| 7,120,675 | B1 * | 10/2006 | Shupak et al. | 709/217 |
| 2006/0173956 | A1 * | 8/2006 | Ulrich et al. | 709/203 |
| 2006/0277226 | A1 * | 12/2006 | Chikusa et al. | 707/201 |
| 2007/0174360 | A1 * | 7/2007 | Yagawa | 707/204 |

FOREIGN PATENT DOCUMENTS

| JP | 2003203029 A | 7/2003 |
| JP | 2003330787 A | 11/2003 |
| JP | 2005532637 A | 10/2005 |
| JP | 2006164169 A | 6/2006 |
| JP | 2006164211 A | 6/2006 |
| JP | 2006524873 A | 11/2006 |

OTHER PUBLICATIONS

Office Action dated Sep. 12, 2008 issued by Japanese Patent Office for priority application No. 2007-036341.

* cited by examiner

*Primary Examiner* — Larry Donaghue (57) ABSTRACT

A system includes a client device to which mount information representing a server device associated with the client is set; a first server corresponding to the mount information set to the client device; a second server communicably connected to the first server; a first disk device controlled by the first server; and a second disk device controlled by the second server. When the client device sends a request to register a data file to the first server, the first server stores the data file in the first disk device and sends a command to make a tag file including information on a location of the data file to the second server. When receiving the command to make the tag file from the first server, the second server makes the tag file and stores it in the second disk device.

10 Claims, 10 Drawing Sheets

FILE SHARING SYSTEM AND FILE SHARING METHOD

This application is based upon and claims the benefit of priority from Japanese patent application No. 2007-036341, filed on Feb. 16, 2007, the disclosure of which is incorporated herein in its entirety by reference.

BACKGROUND OF THE INVENTION

1. Field of the Invention

The present invention relates to a file sharing system for managing a data file shared among a plurality of clients.

2. Description of the Related Art

As techniques relating to a file sharing system, there are known those disclosed in, for example, Japanese Patent Application Laid-Open (JP-A) Nos. 2003-330787 and 2003-203029. A file sharing method disclosed in JP-A-2003-330787 includes a system connected to a LAN, and the system searches a server having a capability potentially available for data sharing and distributes or collects data to the server. A file sharing method disclosed in JP-A-2003-203029 includes further connecting a switch to a network to which clients and servers are connected and transferring an access request from each of the clients to an appropriate server using this switch.

With the method disclosed in JP-A-2003-330787, file sharing can be realized by distributing and arranging a data file to a plurality of servers. However, in the file sharing system disclosed in JP-A-2003-330787, upper limits are set to the number of connected disks and a file capacity that can be managed by one server, respectively. There is also a limit to the capacity of a file system that can be handled by a single file system view. Due to this, the method disclosed in JP-A-2003-330787 has a disadvantage in that it is difficult to improve user's satisfaction with the file sharing system.

With the method disclosed in JP-A-2003-203029, all access requests from the clients are controlled to be transferred to appropriate servers using the single switch. Due to this, a processing load concentrates on the switch. Particularly if the number of clients is quite large, the processing load may possibly exceed an allowable level for the processing of the switch. If the excess of the processing load over the allowable level for the processing causes switch operation to stagnate, a response to the clients is disadvantageously deteriorated and service interruption disadvantageously occurs.

SUMMARY OF THE INVENTION

The present invention has been achieved to solve the conventional disadvantages. It is an object of the present invention to provide a technique for distributing a processing load in a file sharing system and for reducing data amount managed by the file sharing system.

According to a first aspect of the present invention, there is provided a file sharing system including: a client device to which mount information representing one of first and second server devices associated with the client device is set; the first server device corresponding to the mount information set to the client device; the second server device communicably connected to the first server device; a first disk device controlled by the first server device; and a second disk device controlled by the second server device, wherein when the client device sends a request to register a data file to the first server device, the first server device stores the data file in the first disk device and sends a command to make a tag file including information on a location of said data file to the second server device, and when receiving the command to make the tag file from the first server device, the second server device makes said tag file and stores it in the second disk device.

According to a second aspect of the present invention, there is provided a file sharing method for a system including a client device to which mount information representing one of first and second server devices associated with the client device is set; a first server device corresponding to the mount information set to the client device; a second server device communicably connected to the first server device; a first disk device controlled by the first server device; and a second disk device controlled by the second server device, the file sharing method including the steps of: when the client device sends a request to register a data file to the first server device, causing the first server device to store the data file in the first disk device and to send a command to make a tag file including information on a location of the data file to said second server device; and when the second server device receives the command to make the tag file from the first server device, causing the second server device to make said tag file and to store it in the second disk device.

According to the present invention, there is no need to store entities of the same data file in a plurality of disk devices, respectively. This can reduce a data amount to be managed by the file sharing system. Further, since it is the second server that makes and records the tag file, a processing load of the file sharing system can be distributed. Namely, it is possible to avoid concentration of processing related to requests from the client device on the first server device corresponding to mount information on the client device.

DESCRIPTION OF THE PREFERRED EMBODIMENTS

Embodiments of the present invention will be described hereinafter in detail with reference to the accompanying drawings.

First Embodiment

Figure 1:
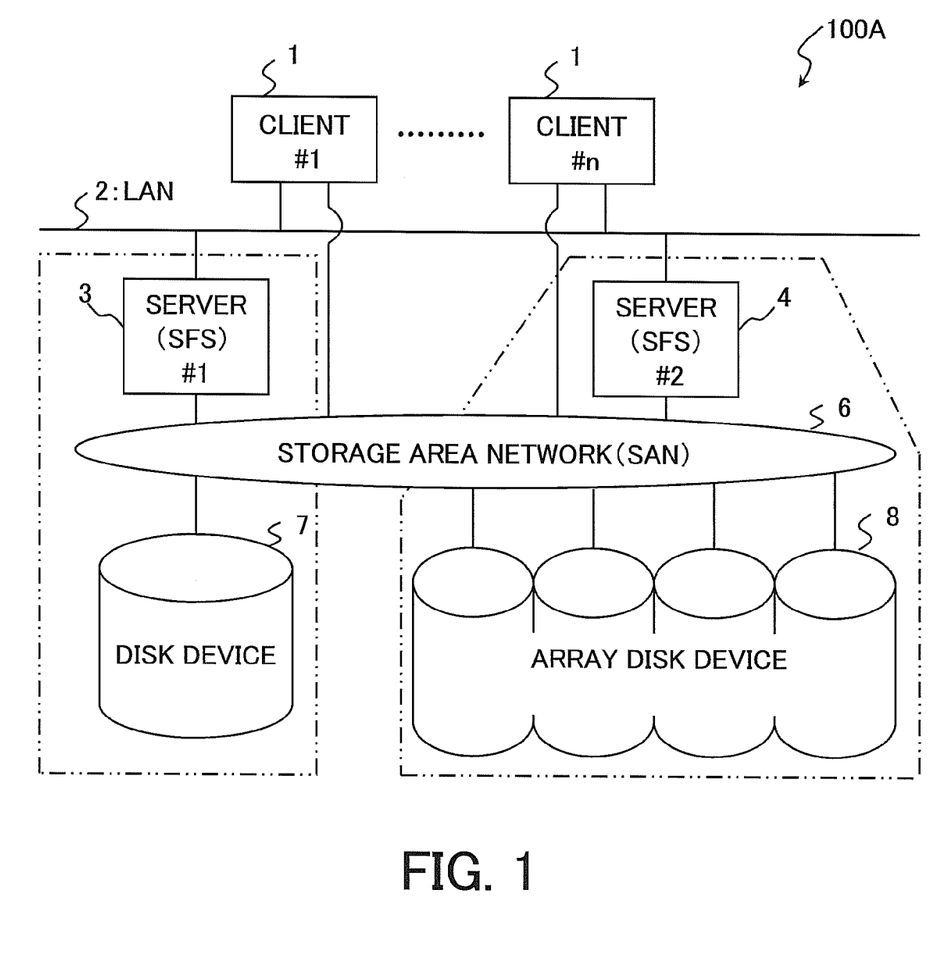
FIG. 1 is a configuration diagram of a file sharing system according to each of first and third embodiments of the present invention.

FIG. 1 shows a basic configuration of a file sharing system according to a first embodiment of the present invention. As shown in FIG. 1, a file sharing system 100A includes one or more clients 1 to n, file sharing system servers (SFS; hereinafter, simply "servers") 3 and 4, a disk device 7, and an array disk device 8 configured to include a plurality of disk devices.

The clients 1 to n, the server 3, and the server 4 are connected to a local area network (LAN) 2. The client 1, the server 3, the server 4, the disk device 7, and the array disk device 8 are connected to a storage area network (SAN) 6.

Mount information representing the server (3 or 4) associated with one of the clients 1 to n is set to the client.

The disk device 7 includes a disk cache mechanism and can process a small-sized IO request at high rate. The array disk device 8 can process a large-capacity file access at high rate.

The server 3 controls files which are registered on the disk device 7, metadata in which information on each of the files is described, and an area such as an inode for storing the metadata. The server 4 controls files, metadata, and an area of the metadata related to the array disk device 8.

A tag file in which information on a location of a file stored in the other disk device is arranged in each of the disk device 7 and the array disk device 8. Namely, a tag file related to the file arranged in the array disk device 8 is arranged in the disk device 7, and a tag file related to the file arranged in the disk device 7 is arranged in the array disk device 8.

Figure 2:
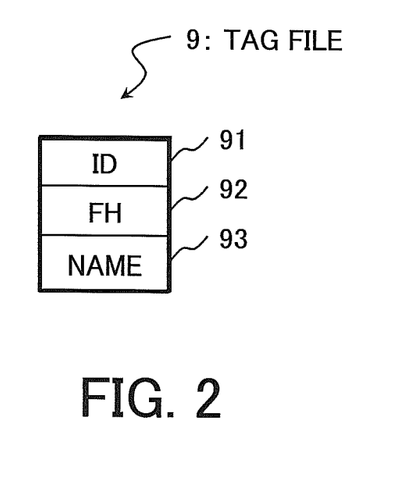
FIG. 2 is an explanatory view of a tag file according to each of first, second, and third embodiments of the present invention.

FIG. 2 shows an exemplary configuration of a tag file 9. The tag file 9 includes an area for recording an identifier (ID) 91 of the server storing therein a file corresponding to the tag file 9, a file handle (FH) 92 that is an identifier for identifying the file, and an actual file name (NAME) 93 including a pass name of the target file.

Figure 3:
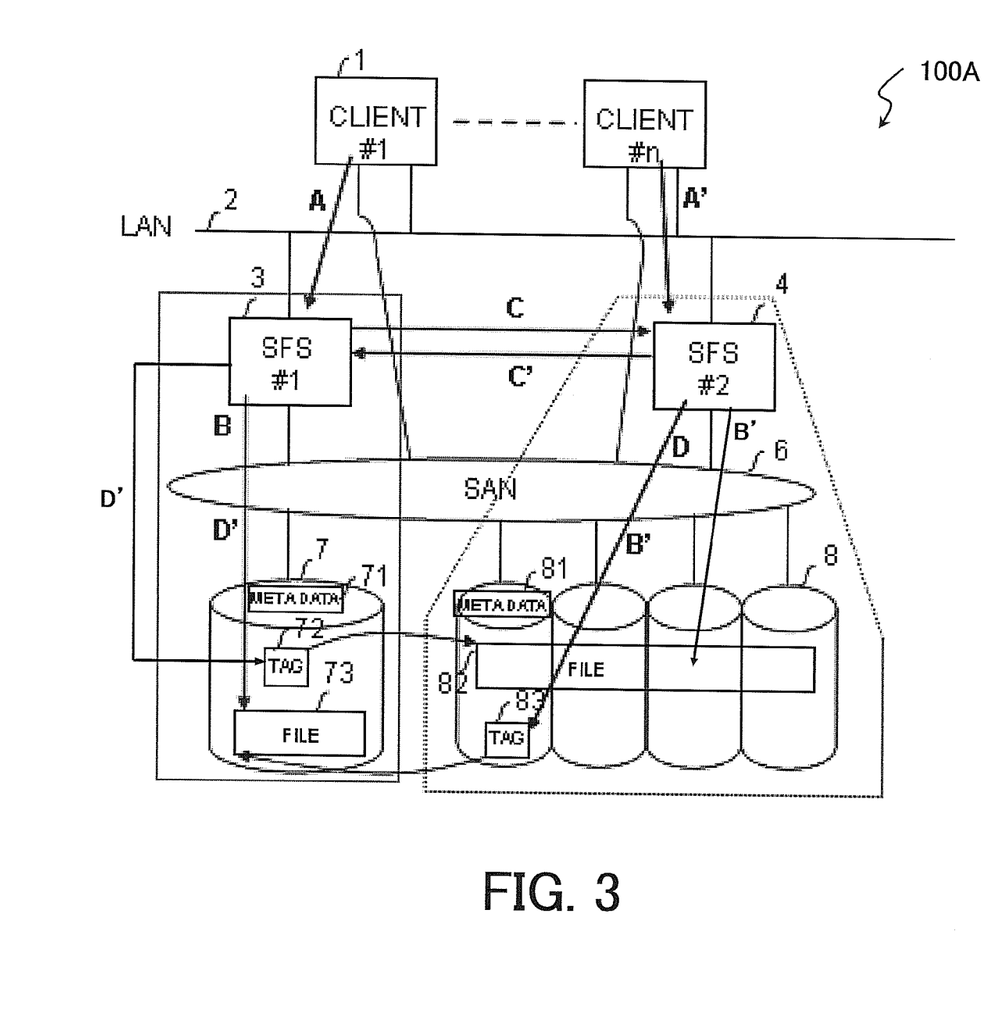
FIG. 3 is an explanatory diagram of operation according to the first embodiment.

Referring to FIG. 3, a description will be given to an operation for registering a new file in response to a request from the client 1 on which only the server 3 is mounted. The expression "only the server 3 is mounted on the client 1" indicates that it is only the server 3 that is indicated by the mount information set to the client 1. Therefore, if a command to confirm a mount status is input to the client 1, only information on the server 3 is send from the client 1 in response to the command.

In this state, the server 3 and the disk device 7 correspond to a first server device and a first disk device, respectively. Further, the server 4 and the array disk device 8 correspond to a second server device and a second disk device, respectively.

When the client 1 sends a command to register a file 73 to the server 3 (A in FIG. 3), the server 3 arranges the file 73 in the disk device 7 via the storage area network 6 (B).

Figure 4:
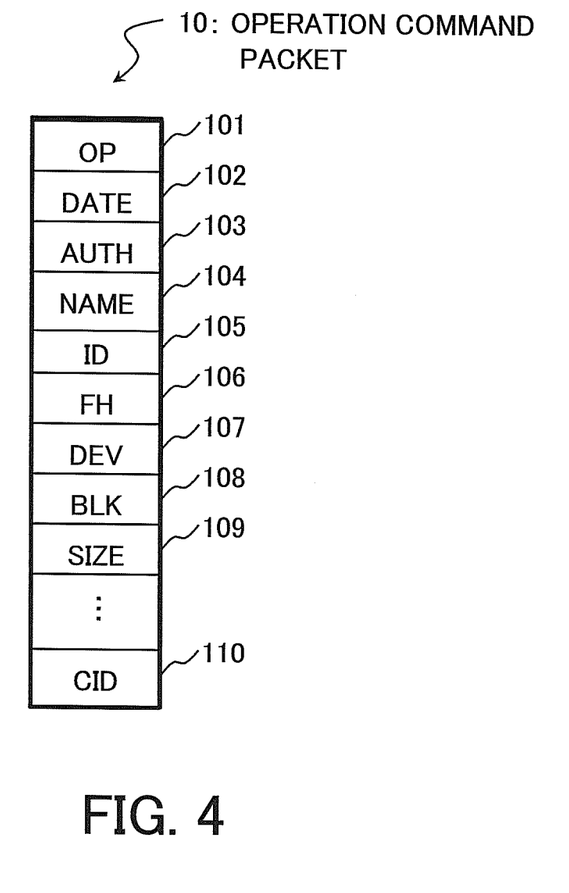
FIG. 4 is an explanatory diagram of an operation command packet according to each of the first, second, and third embodiments.

Further, the server 3 sends a command to arrange a tag file 83 to the server 4 via the local area network 2 (C). To send the command to arrange the tag file 83 from the server 3 to the server 4, an operation command packet 10 configured as shown in FIG. 4 is used. In relation to the operation command packet 10 shown in FIG. 4, the server 3 sets a value signifying "file registration" and a pass name of the file 73 to an OP 101 and a NAME 104, respectively. The server 3 also sets an identifier (e.g., an IP address) of the server 3 managing the file 73 and a file handle of the file 73 to an ID 105 and an FH 106, respectively.

Upon receiving the command to arrange the tag file 83 from the server 3, the server 4 makes the tag file 83 in the format described with reference to FIG. 2 and stores the tag file 83 in the array disk device 8 (D). The identifier of the server 3, the file handle of the file 73, and the pass name of the file 73 are set to the ID 91, the FH 92, and the NAME 93 of the tag file 83 stored at this time, respectively, as shown in FIG. 2. By doing so, the information on the file 73 arranged in the disk device 7 managed by the server 3 is recorded in the array disk device 8 managed by the server 4.

Through the above-stated procedures, a series of processings for registering the file 73 in the disk device 7 is completed.

Similarly, referring to FIG. 3, an operation for creating a file in the array disk device 8 will be described. It is assumed that only the server 4 is mounted on the client 1. In this state, the server 3 and the disk device 7 correspond to the second server device and the second disk device, respectively, and the server 4 and the array disk device 8 correspond to the first server device and the first disk device, respectively.

When the client 1 sends a command to register a file 83 to the server 4 (A' in FIG. 3), the server 4 stores the file 83 in the array disk device 8 via the storage area network 6 (B').

Further, the server 4 sends a command to arrange a tag file 72 to the server 3 via the local area network 2 (C'). To send the command to arrange the tag file 72 from the server 4 to the server 3, the operation command packet 10 as already stated is used. In relation to the operation command packet 10 shown in FIG. 4, the server 4 sets a value signifying "file creation" and a pass name of the file 82 to the OP 101 and the NAME 104, respectively. The server 4 also sets an identifier (e.g., an IP address) of the server 4 managing the file 82 and a file handle of the file 82 to the ID 105 and the FH 106, respectively.

Upon receiving the command to arrange the tag file 72 from the server 4 using the operation command packet, the server 3 makes the tag file 72 in the format described above (FIG. 2) and stores the tag file 72 in the disk device 7 (D') in response to the operation command packet. The identifier of the server 4, the file handle of the file 82, and the pass name of the file 82 are set to the ID 91, the FH 92, and the NAME 93 of the tag file 72 stored at this time, respectively, as shown in FIG. 2. By doing so, the information on the file 82 arranged in the array disk device 8 managed by the server 4 is recorded in the disk device 7 managed by the server 3.

Through the above-stated procedures, a series of processings for creating the file 82 in the array disk device 8 is completed.

Figure 5:
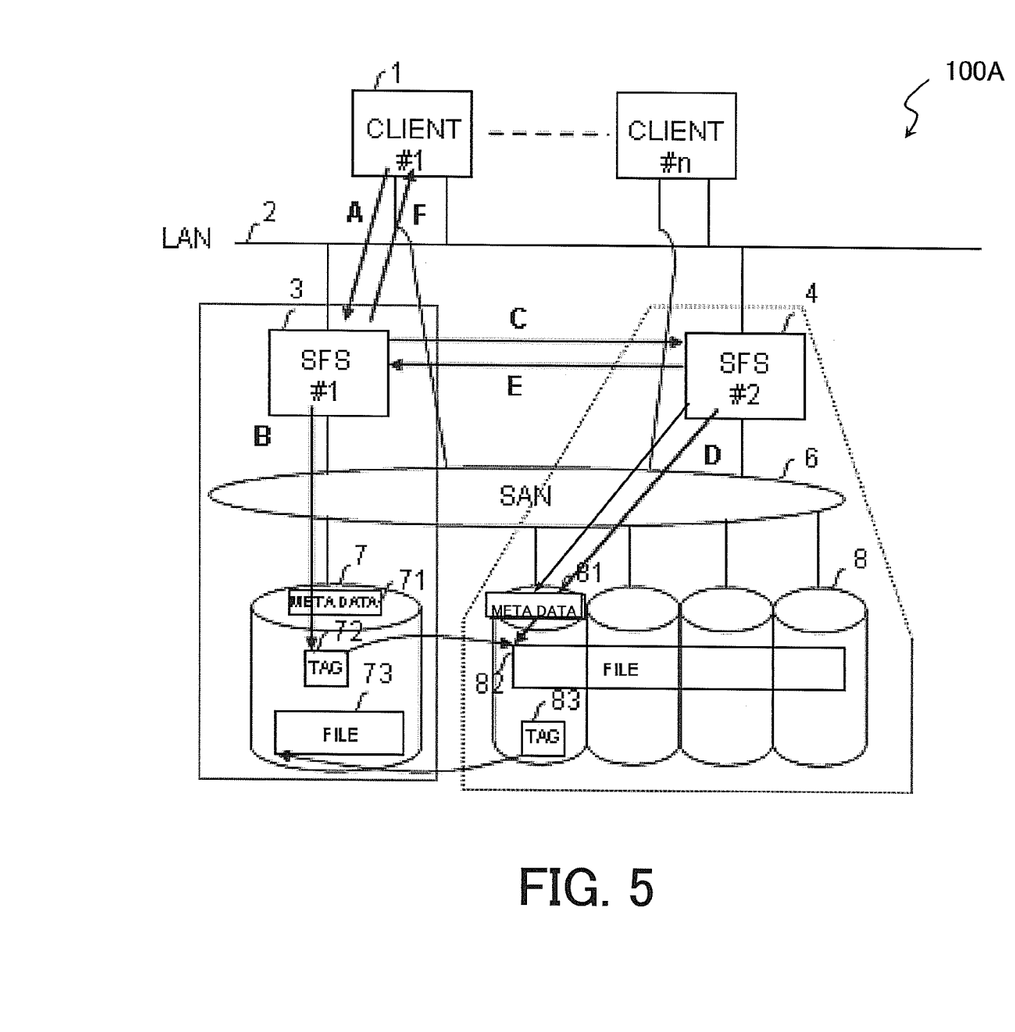
FIG. 5 is an explanatory diagram of operation according to the first embodiment.

Referring next to FIG. 5, a description will be given to an operation for causing the client 1 to acquire information on the file arranged in the disk device managed by the server which is not mounted on the client 1. By way of example, an instance will be described in which the client 1 mounts only the server 3 thereon and acquires information on the file 82 from the array disk device 8 managed by the server 4.

When the client 1 sends a file information acquisition request to the server 3 (A in FIG. 5), the server 3 accesses the disk device 7 and refers to the tag file 72 corresponding to the target file 82 (B). The server 3 sends a file information acquisition command to the server 4 via the local area network 2 using the identifier (ID 91 in FIG. 2) and the file handle (FH 92 in FIG. 2) that are recorded in the tag file 72 (C). This command is made by setting a value signifying "file information acquisition request" to the OP 101 of the operation command packet 10 (FIG. 4) and transmitting the packet 10 to the server 4.

Upon receiving the file information acquisition request from the server 3, the server 4 accesses the array disk device 8 and acquires the metadata 81, the file name, the IP address and the like that are information on the file 82 (D). The data acquired at this time corresponds to data obtained by, for example, stat(2) system call in UNIX. The server 4 transmits the acquired data to the server 3 using the operation command packet 10 (FIG. 4) (E).

As shown in FIG. 4, a value signifying "response to file information acquisition request", a date and time of creation of the file 82, access right information on the file 82, the pass name of the file 82, and the identifier (e.g., IP address) of the server 4 managing the array disk device 8 in which the file 82 is arranged are set to the OP 101, a DATE 102, an AUTH 103, the name 104, and the ID 105 in the operation command packet 10 transmitted from the server 4 to the server 3, respectively.

When acquiring a content of the metadata 81 by the operation command packet 10, the server 3 transmits the content of the metadata 81 to the client 1 (F). The client 1 can thereby acquire information on the file 82 arranged in the array disk device 8.

As can be seen, according to the first embodiment, a tag file related to a file registered on a certain disk device is controlled to be recorded in the other disk device. This makes it unnecessary to store entities of the same file in a plurality of disk devices, respectively. As a consequence, it is possible to reduce a data amount to be managed by the file sharing system. Furthermore, since it is the server managing the disk device storing therein the tag file that makes and records the tag file, a processing load of the file sharing system can be distributed. Namely, it is possible to avoid concentration of the processing related to requests from the client on the server mounted on the client.

Moreover, according to the first embodiment, a distributed file sharing system that realizes a single name space can be constructed for the following reason. Each of a plurality of servers included in the system controls a disk device that does not include an entity of a data file to arrange therein a tag file in which information on the data file is described. It is thereby possible to realize the single name space without need to arrange common file entities in a plurality of disk devices.

Further, it is possible to increase a storage capacity of each file in the system. This is because a total capacity of the disks managed by a plurality of servers arranged in the system can be regarded as a capacity of the entire system.

Second Embodiment

Figure 6:
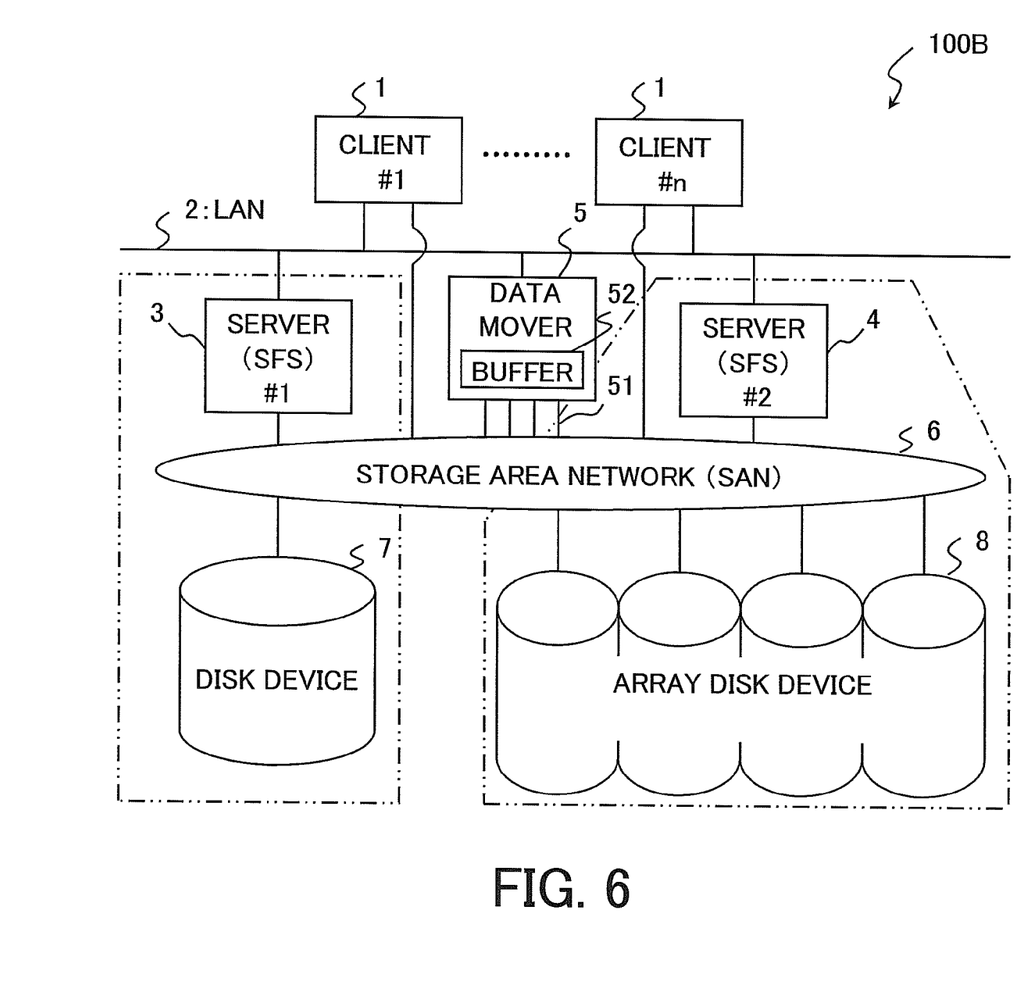
FIG. 6 is a configuration diagram of a file sharing system according to the second embodiment of the present invention.

FIG. 6 shows a configuration of a file sharing system 100B according to a second embodiment of the present invention. The second embodiment is intended to move a file between the servers 3 and 4. The file sharing system 100B according to the second embodiment is similar in configuration to the file sharing system 100A according to the first embodiment shown in FIG. 1 except that a data mover (DM) 5 is additionally provided.

The data mover 5 is connected to the local area network 2, and also connected to the storage area network 6 by a plurality of transmission paths 51 for realizing high speed communication. The data mover 5 includes a buffer 52 temporarily storing therein data.

Figure 7:
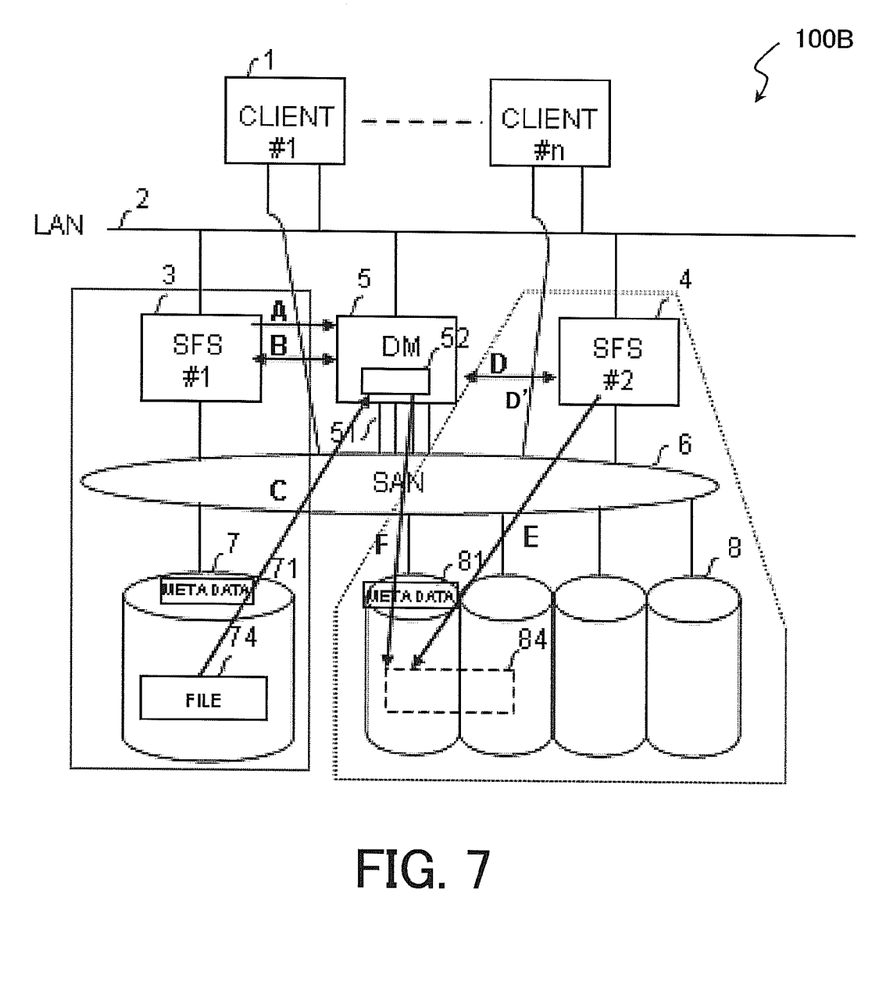
FIG. 7 is an explanatory diagram of operation according to the second embodiment.

Referring to FIG. 7, an operation for moving a file arranged in the disk device 7 to the array disk device 8 will be described. First, the server 3 managing the disk device 7 selects a file 74 arranged in the disk device 7 as a moving target. A momentum of the selection is, for example, an excess of a size of the file 74 over a specified size based on an operation policy set in advance by the server 3.

The server 3 sends a command to move the file 74 arranged in the disk device 7 to the data mover 5 (A in FIG. 7). The command to the data mover 5 at this time is made by the operation command packet 10 already stated above (FIG. 4). Referring to FIG. 4, the server 3 sets a value signifying "data moving request", a file handle of the file 74, and a pass name of the file 74 to the OP 101, the FH 106, and the NAME 104 in the operation command packet 10, respectively.

When receiving the operation command packet 10, the data mover 5 transmits the file handle and the pass name to the server 3 and acquires a block address of the disk device 7 storing therein the file 74 and a size of data of the file 74 from the server 3 using the operation command packet 10 (B).

At this time, a value signifying "acquisition of disk address and data size", the file handle of the file 74, and the pass name of the file 74 are set to the OP 101, the FH 106, and the NAME 104 in the operation command packet 10 (FIG. 4) transmitted from the data mover 5 to the server 3, respectively.

Furthermore, in response to the command, the server 3 transmits the operation command packet 10 to the data mover 5. In the operation command packet 10, a value signifying "response to acquisition of disk address and data size", the identifier (e.g., storage serial number) of the disk device 7, the block address of the disk device 7, the data size (e.g., the number of blocks) are set to the OP 101, a DEV 107, a BLK 108, and a SIZE 109, respectively.

The data mover 5 accesses the disk device 7 via the storage area network 6 using one of the transmission paths 51, and stores the data of the file 74 into the buffer 52 included in the data mover 5 (C).

Next, the data mover 5 sends a command to secure a blank area 84 having a size enough to store the file 74 in the array disk device 8, to the server 4 (D). At the time of sending the command to secure the blank area 84, the data mover 5 transmits the operation command packet 10 in which a value signifying "securing of disk blank area", the pass name of the file 74, and a size to be secured are set to the OP 101, the NAME 104, and the SIZE 109, respectively, to the server 4.

Upon receiving the command from the data mover 5, the server 4 accesses the array disk device 8 to secure the blank area 84 (E), and notifies the data mover 5 of completion of securing the blank area 84 (D').

The data mover 5 accesses the array disk device 8 via the storage area network 6 using one of the transmission paths 51, and writes the data of the file 74 stored in the buffer 52 of the data mover 5 into the blank area 84 of the array disk device 8 (F). The file 74 arranged in the disk device 7 is thereby copied to the array disk device 8.

Thereafter, the data mover 5 performs a processing for deleting the original file 74 remaining in the disk device 7 from the disk device 7. The processing will next be described with reference to FIG. 8.

Figure 8:
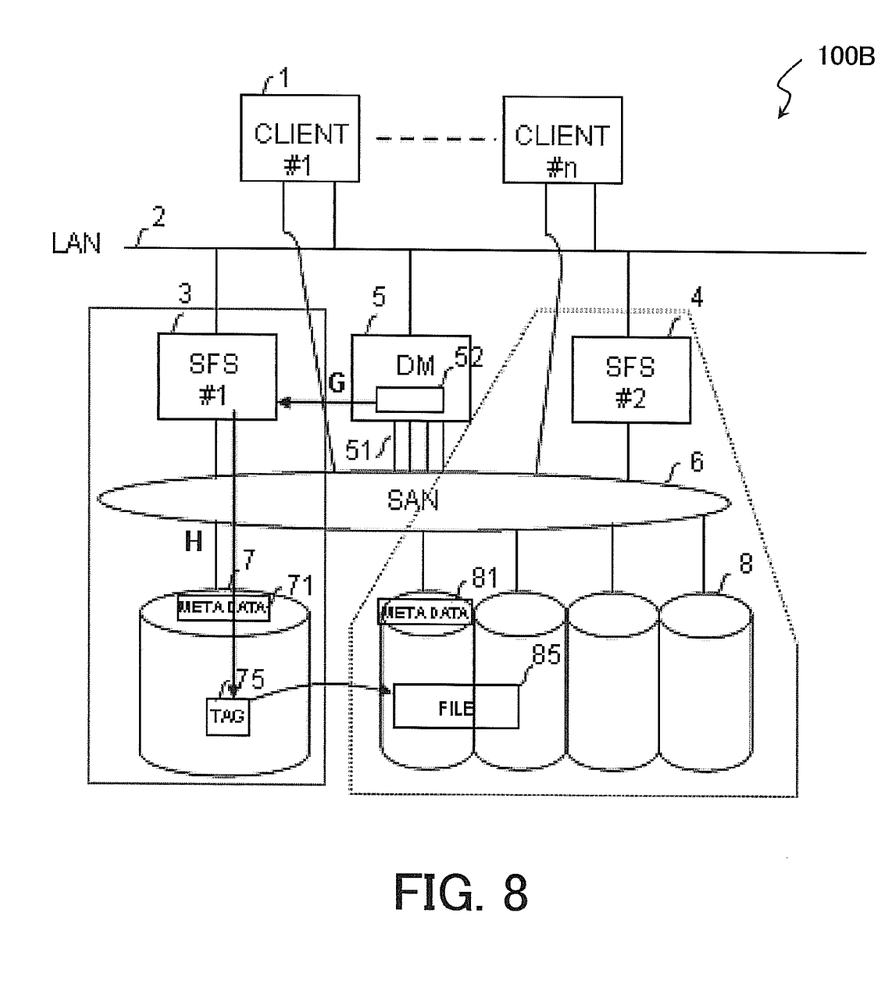
FIG. 8 is an explanatory diagram of the operation according to the second embodiment.

The data mover 5 transmits a command to delete the file 74 using the operation command packet 10 (FIG. 4) in which a value signifying "file deletion" and the pass name of the file 74 to be deleted are set to the OP 101 and the NAME 104, respectively, to the server 3 managing the disk device 7 in which the original file 74 remains (G).

When receiving the command to delete the file 74 from the data mover 5, the server 3 deletes the file 74 remaining in the disk device 7 and makes a tag file 75 (H). The tag file 75 is related to a file 85 that is a copied file to the array disk device 8 based on the original file 74. The identifier (e.g., IP address) of the server 4, a file handle of the file 85, and a pass name of the file 85 are set to the ID 91, the FH 92, and the NAME 93, respectively, in the tag file 74 (FIG. 2).

According to the second embodiment, file movement between the servers 2 and 3 can be made automatically at high speed for the following reason. The data mover 5 interposes between the servers 3 and 4 between which the file is moved, and the file is moved at high speed by the transmission paths 51 of the data mover 5. Furthermore, when the file 74 is moved between the servers 2 and 3, the information (tag file 75) on the file 74 is recorded in the disk device 7 from which the file 74 is moved. Due to this, even if the file 74 is moved, each of the servers 2 and 3 can ensure grasping the location of the file.

In the above-stated description, before the file data retrieve from the disk device 7 is stored in the array disk device 8, the processing (E in FIG. 7) for securing the blank area 84 in the array disk device 8 is performed. However, the processing for securing the blank area 84 can be omitted depending on specifications of the array disk device 8, for example, if the array disk device 8 has a sufficient capacity. In this case, the data mover 5 acquires information on a position at which the moved file is secured from the server 4 and stores the file at the position.

Third Embodiment

A third embodiment of the present invention is intended for a client to acquire file data from a disk device managed by a server that is not mounted on the client. A file sharing system according to the third embodiment is similar in configuration to the file sharing system 100A shown in FIG. 1.

Figure 9:
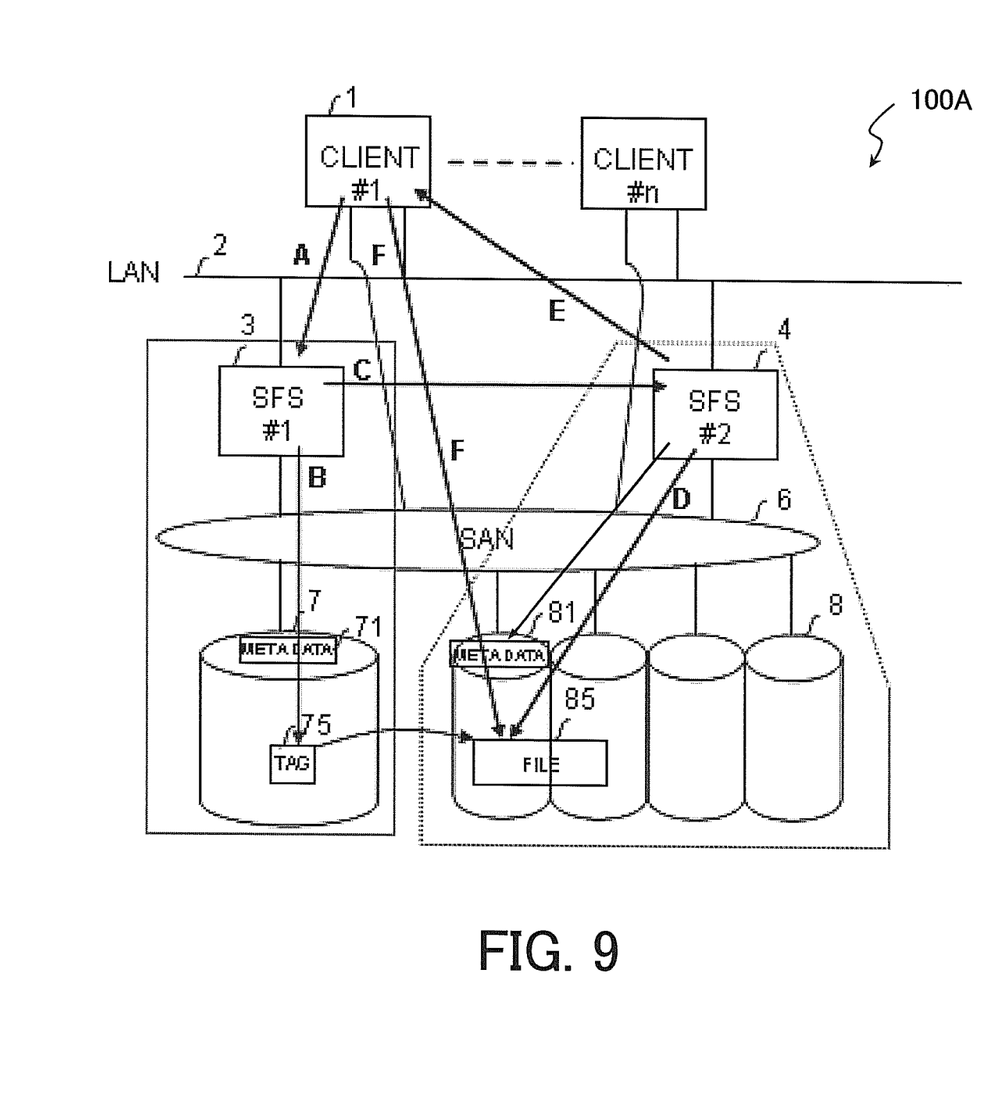
FIG. 9 is an explanatory diagram of operation according to the third embodiment.

Referring to FIG. 9, an instance will be described in which the client 1 mounts only the server 3 thereon and then acquires data of the file 85 from the array disk device 8 managed by the server 4. It is to be noted that the file 85 is moved from the disk device 7 to the array disk device 8 according to the second embodiment. This instance is a case where the server 3 acquires the file 85 from the array disk device 8 for the first time after file movement.

The client 1 that is to acquire the file 85 sends an IO request to the server 3 (A). In response to the 10 request, the server 3 accesses the disk device 7 and acquires a tag file 75 indicating a location of the file 85 (B). This tag file 75 includes the identifier of the server 4 managing the array disk device 8 in which the file 85 is stored as well as the file handle and the pass name of the file 85.

The server 3 transmits a file access request to the server 4 based on the acquired tag file 75 (C). To transmit the file access, the operation command packet 10 (FIG. 4) is used in which a value signifying "file access request", the file handle of the file 85, the pass name of the file 85, and the identifier of the client 1 are set to the OP 101, the FH 106, the NAME 104, and a CID 110, respectively.

The server 4 receiving the file access request from the server 3 acquires the metadata 81 on the file 85 from the array disk device 8 based on the pass name and the file handle in the request. Further, the server 4 acquires information on the block position and size of the file 85 from the metadata 81 (D).

The server 4 transmits the information acquired from the metadata 81 to the client 1 via the local area network 2 using the operation command packet 10 (E). A value signifying "response to acquisition of disk address and data size from array disk device 8", the identifier (e.g., storage serial number) of the array disk device 8, the block address of the array disk device 8, and the data size (e.g., the number of blocks) of the file 85 are set to the OP 101, the DEV 107, the BLK 108, and the SIZE 109 in the operation command packet 10 (FIG. 4) transmitted at this time, respectively.

The client 1 acquires the information of the metadata 81 from the server 4 using the operation command packet 10. At this time, the client 1 also acquires the identifier of the information sender, i.e., the IP address of the server 4. The client 1 directly accesses the array disk device 8 via the storage area network 6 based on the block address and the size that are the information acquired from the server 4, and acquires data on the file 85 (F).

Figure 10:
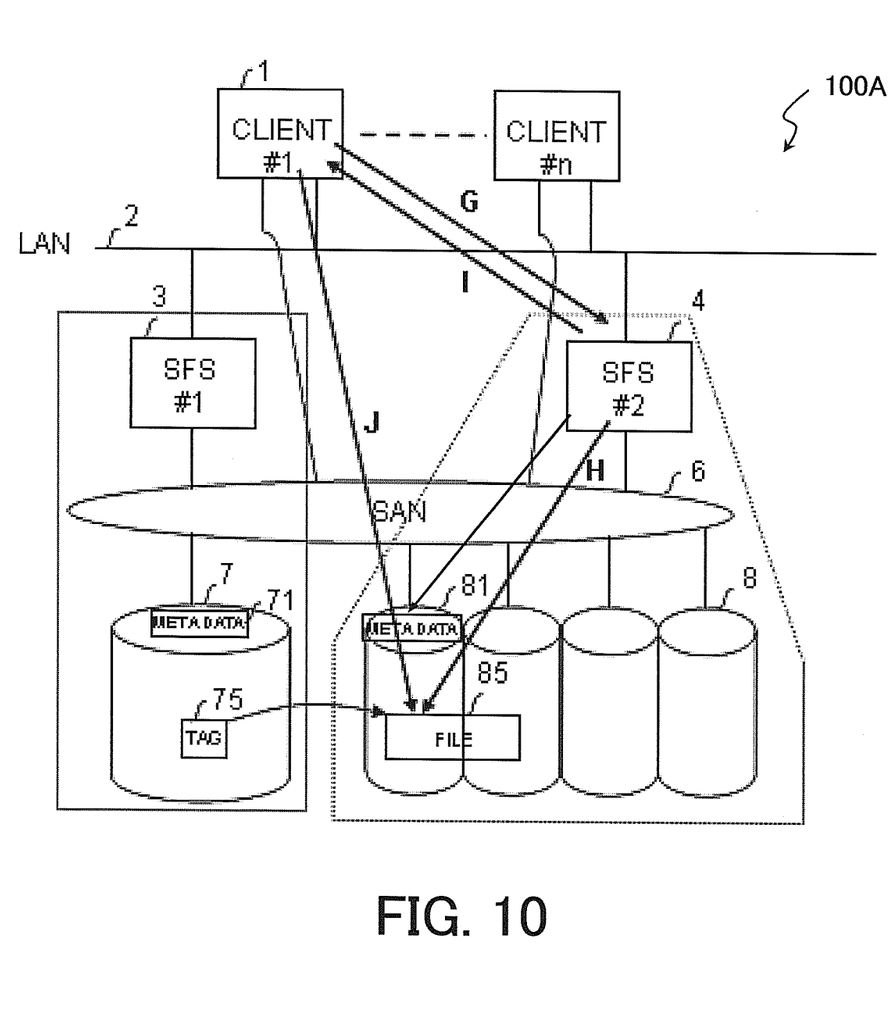
FIG. 10 is an explanatory diagram of the operation according to the third embodiment.

Referring to FIG. 10, an operation for causing the client 1 to access the file 85 in the array disk device 8 again will be described. The client 1 sends an IO request for accessing the file 85 to the server 4 using the IP address of the server 4 acquired at the initial access to the file 85 (G).

The server 4 having received the IO request from the client 1 acquires the metadata 81 on the file 85 from the array disk device 8 (H), and supplies the information on the block position and the size described in the metadata 81 to the client 1 using the operation command packet 10 (I). A value signifying "response to acquisition of disk address and data size", the identifier of the array disk device 8, the block address of the array disk device 8, and the data size of the file 85 are set to the OP 101, the DEV 107, the BLK 108, and the SIZE 109 in the operation command packet 10 (FIG. 4), respectively.

When acquiring the information from the server 4, the client 1 directly accesses the array disk device 8 again via the storage area network 6, and acquires the data of the file 85 based on the information on the block address and the size (J).

In the third embodiment, the file acquired by the client 1 is the file 85 moved from the disk device 7. However, the target file is not limited to the moved file. In other words, a file which is made by the array disk device 8 may be an acquisition target file of the client 1.

According to the third embodiment, the client 1 can access the file 85 moved between the servers 3 and 4 at high speed without changing the server mount information on the client 1 for the following reason. When the client 1 transmits a request of an access to the moved file 85 for the first time, the server 3 mounted on the client 1 transfers the access request from the client 1 to the server 4 managing the target file 85. Furthermore, if the client 1 receives the response to the access request from the server 4 managing the target file 85, the client 1 acquires the address of the server 4. At the time of a second and the following accesses to the same file 85, the client 1 directly transmits the access request to the server 4 managing the target file 85. These functions can make it unnecessary to add mount information that the server 4 is additionally mounted on the client 1 even if the client 1 mounts only the server 3 thereon.

The present invention is suited for a large-scale file system used in, for example, HPC (High Performance Computing) or a file system for a cluster system configured to include many nodes.

Although the exemplary embodiments of the present invention have been described in detail, it should be understood that various changes, substitutions and alternatives can be made therein without departing from the spirit and scope of the invention as defined by the appended claims. Further, it is the inventor's intent to retain all equivalents of the claimed invention even if the claims are amended during prosecution.

What is claimed is:

1. A file sharing system comprising:
   a client device to which mount information representing server devices mounted on the client device is set;
   a first server device of the server devices and represented by the mount information set to the client device;
   a second server device of the server devices and communicably connected to the first server device;
   a first disk device controlled by the first server device; and
   a second disk device controlled by the second server device,
   wherein when the client device sends a request to register a data file to the first server device, the first server device stores the data file in the first disk device and sends to the second server device a command to make a tag file including information on a location of said data file, and when receiving the command to make the tag file from the first server device, the second server device makes said tag file and stores it in the second disk device, wherein when receiving the command to make a tag file from the second server device, the first server device makes the tag file and stores it in the first disk device, and when receiving from the client device a request of an access to a data file stored in the second disk device, the first server device retrieves from the first disk device the stored tag file associated with said data file and sends a request of an access to the data file to the second server device based on the retrieved tag file and notifies an identifier of the client device to the second server device, when receiving from the first server device the request of the access to the data file in the second disk device, the second server device notifies information for accessing the data file to the client device specified by the notified identifier, and when receiving from the second server device the information for accessing the data file, the client device accesses the second disk device using the received information.

2. The file sharing system according to claim 1, wherein when receiving from the client device a request of information on a data file stored in the second disk device, the first server device retrieves a tag file associated with said data file from the first disk device and sends to the second server device a request of the information on said data file based on the retrieved tag file, and when receiving from the first server device the request of the information on said data file, the second server device retrieves the information on said data file from the second disk device and sends the retrieved information to the first server device.

3. The file sharing system according to claim 1, further comprising a data transfer device communicably connected to the first and second servers and the first and second disk devices, wherein if each of the first and second server devices is to move a data file stored in the respective disk devices to the other disk device controlled by the other server, each of the first and second server devices sends to the data transfer device a request of moving corresponding data file as well as information on said data file, and when receiving the request of moving the data file, the data transfer device retrieves the data file from the first or second disk device storing therein said data file and stores said data file to the other disk device to which the data file is moved.

4. The file sharing system according to claim 3, wherein the data transfer device requests the first or second server device that controls the other disk device to which the data file is moved to secure an memory area corresponding to a size of the data file requested to be moved and stores the data file on the memory area when said area is secured.

5. The file sharing system according to claim 1, wherein when notifying to the client device the information for accessing the data file, the second server device also notifies address information on the second server device to the client device, and if the client device accesses in the second disk device a same data file as the client device has accessed, the client device sends to the second server device a request to access the same data file using the address information notified from the second server device.

6. A file sharing method for a system including a client device to which mount information representing server devices mounted on the client device is set; a first server device of the server devices and represented by the mount information set to the client device; a second server device of the server devices and communicably connected to the first server device; a first disk device controlled by the first server device; and a second disk device controlled by the second server device, the file sharing method comprising steps of:

when the client device sends a request to register a data file to the first server device, causing the first server device to store the data file in the first disk device and to send to the second server device a command to make a tag file including information on a location of the data file;

when the second server device receives from the first server device the command to make the tag file, causing the second server device to make said tag file and to store it in the second disk device;

when the first server device receives from the second server device the command to make the tag file, causing the first server device to make the tag file and store it in the first disk device;

when the first server device receives from the client device a request of an access to a data file stored in the second disk device, causing the first server device to retrieve the stored tag file from the first disk device, send to the second server device a request of an access to the data file based on the retrieved tag file and notify an identifier of the client device to the second server device;

when the second server device receives from the first server device the request of the access to the data file in the second disk device, causing the second server device to notify information for accessing the data file to the client device specified by the notified identifier; and when the client device receives from the second server device the information for accessing the data file, causing the client device to access the second disk device using the received information.

7. The file sharing method according to claim 6, further comprising steps of:

when receiving from the client device a request of information on a data file stored in the second disk device, causing the first server device to retrieve a tag file associated with said data file from the first disk device and to send to the second server device a request of the information on said data file based on the retrieved tag file, and when the second server device receives from the first server device the request of the information on said data file, causing the second server device to retrieve the information on said data file from the second disk device and to send the retrieved information to the first server device.

8. The file sharing method according to claim 6, further comprising the steps of:

if each of the first and second server devices is to move a data file stored in the respective disk devices to the other disk device controlled by the other server, causing each of the first and second server devices to send a request of moving corresponding data file as well as information on said data file to a data transfer device communicably connected to the first and second servers; and when the data transfer device receives the request of moving the data file, causing the data transfer device to retrieve the data file from the first or second disk device storing therein said data file and to store said data file to the other disk device to which the data file is moved.

9. The file sharing method according to claim 8, further comprising the steps of:
- causing the data transfer device to further request the first or second server device that controls the other disk device to which the data file is moved to secure an memory area corresponding to a size of the data file requested to be moved; and
- causing the data transfer device to store the data file on the memory area when said area is secured.

10. The file sharing method according to claim 6, wherein when the second server device notifies to the client device the information for accessing the data file, causing the second server device to also send notify address information on the second server device to the client device; and
- if the client device accesses in the second disk device a same data file as the client device has accessed, causing the client device to send to the second server device a request to access the same data file using the address information notified from the second server device.

* * * * *